United States Patent [19]

Smith

[11] Patent Number: 5,492,373
[45] Date of Patent: Feb. 20, 1996

[54] WELLHEAD FLANGE FOR INTERCONNECTING A THREADED WELLHEAD AND A FLANGED BLOWOUT PREVENTER

[75] Inventor: Leslie D. Smith, Fritch, Tex.

[73] Assignee: J. M. Huber Corporation, Edison, N.J.

[21] Appl. No.: 314,054

[22] Filed: Sep. 28, 1994

[51] Int. Cl.⁶ .................................................... F16L 55/00
[52] U.S. Cl. .......................... 285/175; 285/12; 285/143; 285/368; 285/414; 285/349
[58] Field of Search ..................................... 285/414, 368, 285/412, 363, 405, 349, 169, 175, 140, 141, 142, 143, 12

[56] References Cited

U.S. PATENT DOCUMENTS

| | | | |
|---|---|---|---|
| 2,109,031 | 2/1938 | O'Neal | 285/414 X |
| 2,826,436 | 3/1958 | Hupp et al. | 285/368 X |
| 3,850,455 | 11/1974 | Stafford | 285/368 X |
| 4,225,161 | 9/1980 | Smith | 285/349 X |
| 4,252,346 | 2/1981 | Sundholm | 285/414 X |
| 4,538,835 | 9/1985 | Sundholm | 285/349 X |
| 5,000,492 | 3/1991 | Kemp | 285/414 X |
| 5,163,712 | 11/1992 | Subo et al. | 285/414 X |

*Primary Examiner*—Dave W. Arola
*Attorney, Agent, or Firm*—Browning, Bushman, Anderson & Brookhart

[57] ABSTRACT

A wellhead flange assembly 12 is provided for interconnecting the threaded end of an upwardly projecting screwed wellhead 16 with a lower flange of the blowout preventer 24. The flange assembly comprises a threaded adapter 40 including a thin-walled portion 54, a flange support portion 56, and an upper stop portion 52. A wellhead flange 42 includes a plurality of bolt holes 44 and an upper surface 51 for engagement with the lower flange of the blowout preventer. A plurality of securing members 48 are provided for selectively connecting and disconnecting the wellhead flange 42 and the threaded adapter 40. An adapter-to-flange seal 60 is provided for sealing engagement between the threaded adapter 40 and the wellhead flange 42. According the method of the invention, the threaded adapter may be easily heated to facilitate removal from the screwed wellhead, or may be cut off the screwed wellhead without damaging the screwed wellhead, thereby permitting the reuse of the wellhead flange on a new well.

14 Claims, 2 Drawing Sheets

WELLHEAD FLANGE FOR INTERCONNECTING A THREADED WELLHEAD AND A FLANGED BLOWOUT PREVENTER

BACKGROUND OF THE INVENTION

1. Field of the Invention

The present invention relates to methods and apparatus for interconnecting a screwed oilfield wellhead and downstream equipment. More particularly, the present invention relates to improves techniques for more reliably connecting and easily disconnecting a screwed oilfield wellhead with a flanged blowout preventer.

2. Description of the Relevant Art

There are two popular types of casing heads used in oilfield operations. An independent screwed casing head is classified by the American Petroleum Institute (API) in a publication referred to as Specification 6A. This type of casing head utilizes a threaded top-end connector with a cap or "top nut" that closes off the annulus between the surface casing and the production casing string. The casing head is typically threaded onto the top of the surface casing with the production casing rising above the casing head top nut or top connector. A tubing head is then typically threaded onto the top of the production casing string. Since the tubing head body and casing head bodies are not in contact with each other, they are classified as "independent." Also, the independent screwed casing head is not dependent upon the tubing head to form a completely pressure-sealed unit.

The second type of commonly used casing head is a flanged casing head, which generally meets the standards of API Specification 6A or may have dimensionally compatible flanges meeting the requirements of the American National Standards Institute (ANSI). The flanged casing head permits direct mating to a tubing head having the same size lower flange, rather than to a lower thread connection. The production casing is typically cut off a few inches above the top flange of the casing head, and the flanged tubing head has a lower recess or socket within a rubber seal that slides down over the protruding casing until both flanges mate. The flanged casing head is dependent upon the flange tubing head to achieve a complete seal between the surface casing and the production casing. Since the tubing head slides freely over the top of the production casing until it contacts the top flange of the casing head, the weight of the tubing is supported only by the casing head body and not by the production casing hanger. This feature reduces the chances of overloading the production casing hanger mechanism when utilizing a flanged casing head.

Flanged casing heads were initially developed for high pressure or deep wells. Flanged casing heads typically are designed for pressures in excess of 10,000 psi and for applications involving more than 5,000 meters well depth. Independent screwed casing heads, on the other hand, typically have a maximum pressure capability of only several thousand psi and typically are used on wells of less than 3,000 meters. Flanged casing heads are typically massive in size and weight compared to independent screwed casing heads due to the more stringent design of pressure and depth conditions. Accordingly, flanged casing heads are typically much more expensive than independent screwed casing heads.

While independent screwed casing heads are satisfactory for many applications, it has become increasingly more common for over a decade to utilize blowout preventers (BOPs) as mandatory equipment even when drilling and completing shallow, low pressure wells. Accordingly, most BOPs in use today have a massive API bottom flange to mate with a flanged casing head. An adapter flange, also known as a drilling flange, may be used to temporarily mate the top thread of an independent screwed casing head and therefore provide the connection between an independent screwed casing head and a flanged BOP. Since the production casing string has to be run through the BOP after drilling, the casing head is installed below the BOP, so that the casing hanger mechanism can be safely set.

Currently available drilling flanges can convert an independent screwed casing head to one that accommodates a flanged BOP. Drilling flanges are, however, unfortunately vulnerable to a phenomenon known as "thread galling," wherein the female thread in the drilling flange becomes seized to the male thread on the top end of the connection of the casing head body. When thread galling occurs, the casing head and drilling flange must be removed and replaced with a new casing head body prior to running production casing downhole. The annulus between the production casing and the surface casing thus usually cannot readily be closed off with the drilling flange left permanently in place, since the annular seal cannot be retained unless the top nut is installed. Most attempts at removing the seized drilling flange from the casing head body result in the original casing head body becoming ruined, and often the drilling flange is so badly damaged that it also has to be discarded. At the very least, the damaged flange will require considerable reconditioning at substantial expense, which is a significant drawback to the continued use of the less expensive independent screwed casing head.

In an attempt to eliminate the above-described galling problem, some manufacturers have employed a "pack-off plate" or "compression flange" with an API flanged casing head. This pack-off plate closes the annulus between the independent screwed casing head and the production casing, and thus performs the function of the top nut on the independent screwed casing head. When a pack-off plate is used, the production casing is thus permitted to rise above the casing head to allow an independent screwed tubing head to be threaded thereon, rather than using a much more expensive API flanged tubing head. Due to the relatively massive size of the standard API flange on the casing head, the diameter of the pack-off plate is relatively large, so that this procedure unfortunately is generally not economical, particularly when compared to the lower cost of the original independent screwed casing head. The continued utilization of the significantly less expensive independent screwed casing head rather than an API ranged casing head would result in a considerable equipment budget savings recognized by an oil company.

One attempt to resolve the problem described above with respect to independent screwed casing heads was developed by J. M. Huber Corporation and may be referred to as the "bolt-on flange assembly." The bolt-on flange assembly was installed on an independent screwed casing head for interconnecting the casing head to a ranged BOP. This assembly primarily consisted of a threaded adapter and a flange vertically above the adapter and supported on both the screwed casing head and the adapter. Once installed on the casing head, the bolt-on flange could remain a permanent part of the wellhead assembly. The flange could thus be used for both interconnection with a BOP and for subsequent interconnection with a flange or gland once the BOP was removed. After a drilling operation is complete, the flange also could be removed from the threaded adapter and replaced with a relatively small and inexpensive packoff flange or gland, which could then be bolted to the adapter so that the flange could be reused on another well. Since the flange is sealed directly to the wellhead, only a single flange/wellhead seal is required. This design recognized the difficulty of reliably breaking the threaded flange/wellhead connection after drilling, and obviated the problem by leaving the threaded adapter in place while reusing the more massive and expensive flange that was bolted to, and positioned vertically above, the adapter. The bolt-on flange assembly thus envisioned that the flange would mate with a BOP and that the flange could be disconnected from the threaded adapter and removed with the BOP to a new well when drilling is complete. The threaded adapter could remain in place for bolted interconnection with a much smaller flange that retains the annulus seal inside the wellhead.

While the bolt-on flange assembly diminishes the problem associated with the threads of an independent screwed casing head seizing to the point that the casing head had to be destroyed, this technique also does not fully satisfy the needs of many customers. Further improvements are required so that the independent screwed casing head may be readily adapted for attachment to a ranged BOP. Substantial equipment savings will be realized and drilling downtime decreased for many oil companies that are drilling relatively shallow, low pressure wells if such improvements are developed.

The disadvantages of the prior art are overcome by the present invention. Improved techniques and equipment are hereinafter disclosed for economically interconnecting an independent screwed casing head with a ranged BOP. The improved equipment and techniques of the present invention overcome many of the problems associated with the prior art drilling flange assemblies, and persons skilled in the art will appreciate that the present invention solves or substantially eliminates many of the problems discussed above.

SUMMARY OF THE INVENTION

The drilling flange assembly of the present invention is designed to be disconnected from the wellhead after drilling in a manner similar to that of a conventional threaded drilling flange. In a preferred design, an adapter is designed to facilitate its removal if and when the threads of an independent screwed casing head (or wellhead) become galled. Normally, both the adapter and the flange of the assembly can be reused. If the adapter cannot be successfully removed from the wellhead, the adapter may be easily destroyed during its removal while the more expensive flange nevertheless saved for reuse with a new adapter. The flange does not mate directly to the wellhead, and both an adapter/wellhead seal and an adapter/flange seal are provided.

The flange assembly of the present invention thus enables the removal of the threaded wellhead/flange connection after drilling and facilitates this removal rather than obviating removal in a manner of the bolt-on flange assembly. Specifically, the wall of the adapter is relatively thin. The bolts are spaced radially outward from the adapter wall to facilitate heating and thus breaking apart of the threads. After repeated use, threads on one adapter may become worn, and a new adapter used. If the adapter cannot be successfully removed and saved, the thin-walled adapter can be easily cut off the wellhead without destroying the wellhead threads, and the more expensive flange still reused with a new adapter. The adapter thus mates with the flange, and the flange mates with the BOP. Both the adapter and the flange may be removed with the BOP after drilling. After the adapter and flange are removed, a conventional threaded top nut may be installed on the wellhead.

It is an object of the present invention to provide an improved drilling flange assembly for interconnecting an independent screwed wellhead with a ranged BOP. A related object of the present invention is to reduce the size and thus the cost of equipment involved in reliably sealing a relatively low pressure well during drilling operations.

A feature of the invention is that the more expensive flange portion of the assembly may be reliably reused, even if the less expensive adapter portion of the assembly has to be destroyed during the removal operation. Costly downtime for petroleum recovery operations may be reduced and the high expense associated with maintaining a large inventory of parts also be reduced by utilizing the concepts of the invention.

A significant advantage of the present invention is that an independent screwed wellhead may be easily and reliably connected to a standard ranged BOP. A related advantage of the invention is that fewer flanges are required by the drilling crew to accomodate different sizes and styles of independent wellhead top end threads. As an example, to adapt a BOP using current style drilling flanges to the two most popular nominal casing head top thread sizes, both of which are available in two incompatible thread styles which vary between specific manufacturers, four relatively expensive flanges are required. With the proposed invention, the user only has to purchase and maintain one wellhead flange along with four relatively inexpensive threaded adapters.

These and further objects, features, and advantages of the present invention will become apparent from the following detailed description, wherein reference is made to the figures in the accompanying drawings.

DETAILED DESCRIPTION OF THE PREFERRED EMBODIMENTS

Figure 1:
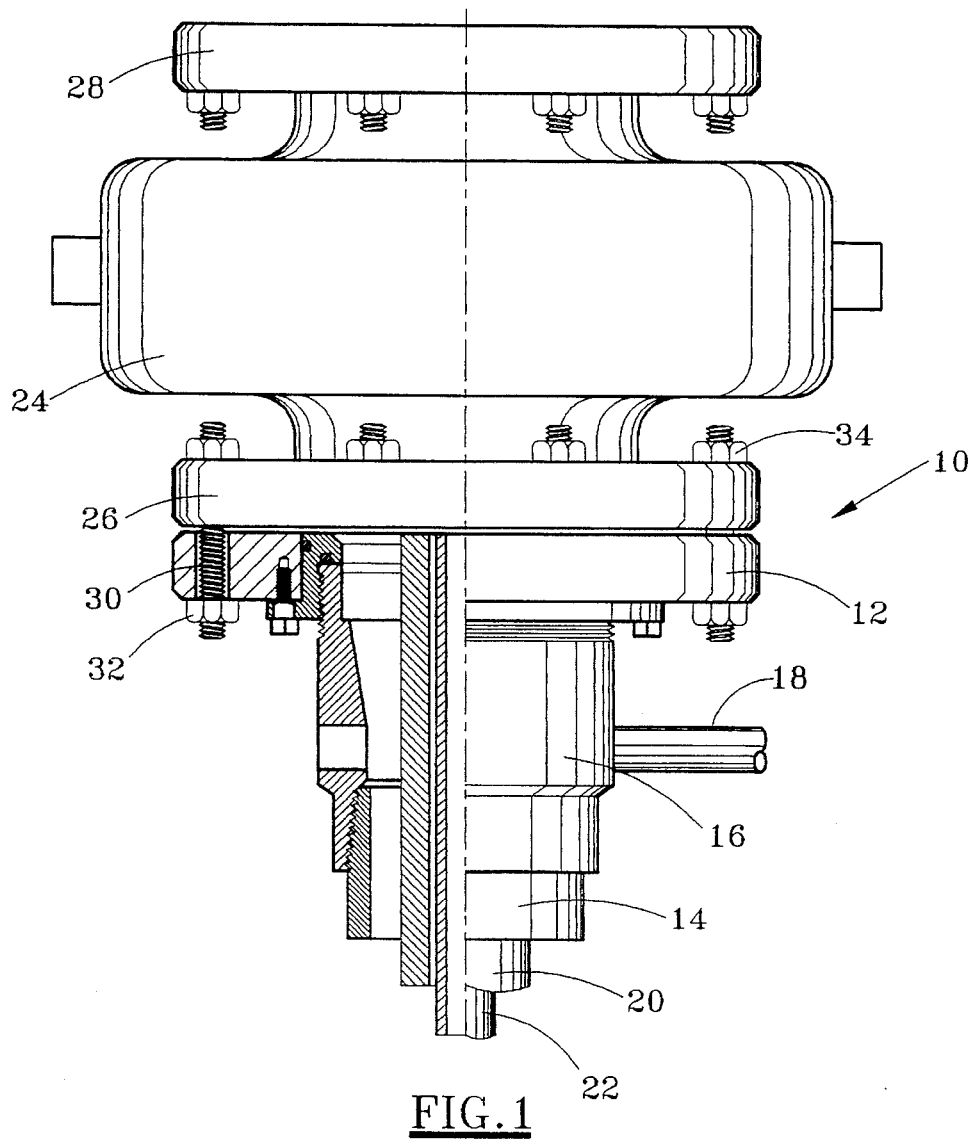
FIG. 1 is a side view, partially in cross-section, illustrating a suitable drilling flange assembly according to the present invention interconnecting a wellhead flange and a flanged BOP.

A wellhead flange assembly is shown in FIG. 1 interconnecting an independent screwed casing head and a ranged blowout preventer (BOP). The overall assembly 10 depicted in FIG. 1 comprises a wellhead flange assembly 12 threadably connected at the upper end of the independent screwed casing head 16, which has a surface casing 14 projecting downwardly therefrom. Casing head 16 includes one or more generally horizontal flow pipes 18 in fluid communication with the annulus between surface casing 14 and production casing string 20.

The wellhead flange assembly 12 will be discussed in detail subsequently. It should be understood, however, that the assembly 12 is adapted for removably securing the independent screwed casing head 16 or another threaded wellhead to a blowout preventer, such as the BOP 24 generally depicted in FIG. 1. A typical blowout preventer 24 includes a lower flange 26 and an upper flange 28. A plurality of securing members, such as conventional threaded bolts 30 and nut assemblies 32, may be used to mechanically secure the wellhead flange assembly 12 with the lower flange 26 of the BOP 24, as shown in FIG. 1. A conventional seal is used to reliably seal between flange 26 and the flange of wellhead flange assembly 12.

Those skilled in the art will appreciate that the independent screwed casing head 16 may be of the type intended to be packed off after drilling and completing the well. A seal between the production casing string 20 and the casing head 16 may be made with a conventional pack-off assembly consisting of gripping slips, a top ring, a bottom ring, and intermediate bias and sealing members. This pack-off assembly may thus fit within, and be supported by, the casing head 16 at a location slightly above the flowpipes 18.

Figure 2:
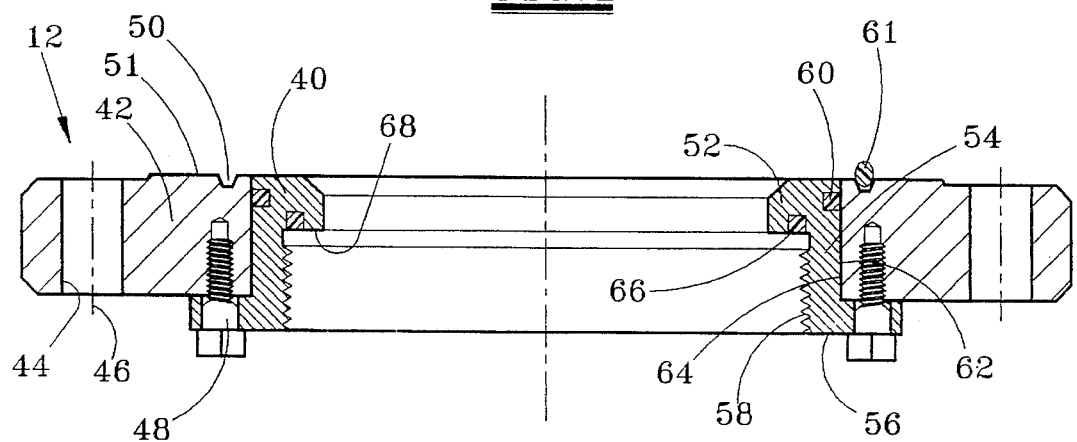
FIG. 2 is a detailed cross-sectional view of the drilling flange assembly generally shown in FIG. 1.

FIG. 2 more clearly illustrates a suitable wellhead flange assembly 12 according to the present invention. The assembly 12 comprises a threaded adapter 40 and a wellhead flange 42 spaced radially outward from, and supported on, the threaded adapter. The flange 42 comprises a plurality of circumferentially spaced bolt holes 44, each having a bolt axis 46. Those skilled in the art will appreciate that the bolts 30 as shown in FIG. 1 may each pass through a respective bolt hole 44 in the planar flange 42 for affixing the lower flange 26 of the BOP 24 to the wellhead flange assembly 12.

Various techniques may be used for mechanically interconnecting the threaded adapter 40 and the flange 42, although this interconnection should be of the type that allows the flange 42 to be reliably connected to, and subsequently disconnected from, the adapter 40. Suitable securing members may consist of bolts 48, as shown in FIG. 2, that pass through an aperture in the threaded adapter and are received within a threaded pocket within the wellhead flange 42. FIG. 2 also illustrates an annular groove 50 formed along the top planar surface 51 of the flange 42. The groove 50 is designed for receiving a conventional seal ring (simplistically shown in FIG. 2 as seal 61) to maintain reliable sealed engagement between the flange 42 and the lower flange of the BOP.

The threaded adapter 40 comprises a thin-walled portion 54 having an outer surface 62 and radially internal threads 58 for threaded engagement with the threaded end of the upwardly projecting threads on a screwed wellhead. Adapter 40 also includes lower flange support portion 56 projecting radially outward from the thin-walled portion 54. The flange support portion 56 includes the plurality of bolt hole apertures for receiving the bolts 48 discussed above. The threaded adapter also includes an upper stop portion 52 projecting radially inward from the thin-walled portion 54. Stop portion 52 is designed for engagement with the wellhead and carries first and second sealing rings 60 and 66.

Sealing ring 60 is an adapter-to-flange seal for sealing engagement between the threaded adapter 40 and the wellhead flange 42. The outer surface 62 of both the thin-walled portion 54 and the upper stop portion 52 thus has a substantially uniform cylindrical configuration, while the corresponding surface 64 of the wellhead flange 42 has a similarly shaped cylindrical surface for facilitating sealed engagement with the adapter-to-flange seal 60. Those skilled in the art will appreciate that the seal 60 could be installed at various selected locations along the axial length of the mating surfaces 62 and 64. The adapter-to-wellhead seal 66 is provided for sealing engagement between the threaded adapter 40 and the top of the screwed wellhead as shown in FIG. 1. A sealing ring such as 66 is preferably utilized to maintain sealed engagement between the adapter and the screwed wellhead, although alternatively the seal could be provided by the threads 58. If the threads 58 are intended to provide both a mechanical connection between the threaded adapter and the wellhead and a sealed connection between these components, the torque that must be supplied to the threaded adapter to maintain a reliable seal with the threads 58 is such that the likelihood of galling and seizing between the threads is increased. Accordingly, the chances of seizing are substantially decreased by providing the seal 66 between the threaded adapter and the wellhead so that the threads 58 need only provide a mechanical connection.

The wellhead flange assembly 12 as shown in FIG. 1 positions the plurality of bolt holes 42 in the wellhead flange radially outward of the securing members 48 to provide the bolted interconnection between the wellhead flange 42 and the threaded adapter 40. As explained below, the radial thickness of the thin-walled portion of the threaded adapter 40 is controlled so that it is less than about 66% of the diameter of the radially internal threads, and more preferably is less than about 18% of the diameter of the radially internal threads 58. Also, the axial length of the thin-walled portion 54 of the threaded adapter may be at least twice the axial length of the flange support portion 56.

According to the method of the present invention, the adapter 40 may be threaded to the threaded end of the upwardly projecting screwed wellhead. The wellhead flange 52 may be supported on the threaded adapter and mechanically secured thereto by securing members 48, while the seal 60 provides a sealed connection between the threaded adapter and the wellhead flange. The assembly as shown in FIG. 2 is thus suitable for reliable connection to a ranged BOP. Once the drilling operation is complete, the BOP may be removed from the flange 42, and the flange 42 and the threaded adapter 40 removed as an assembly from the screwed wellhead.

Because of the possibilities of dirty threads, damaged, threads, or threads "fretted" by excessive whipping, it is possible that the threads on the threaded adapter may seize with the threads on the screwed wellhead. A significant benefit to the adapter as shown in FIG. 2 is that the relatively thin-walled portion 54 allows the threaded adapter to be easily heated with a torch or other conventional heating means to facilitate breaking apart the threads between the adapter and the screwed wellhead. In other words, the entire mass of the wellhead flange assembly 12 need not be heated, and only the relatively small mass of the assembly in the area of the thin-walled portion 54 will generally be required to break the threaded connection between the threaded adapter and the flange.

In some cases, it may be practically impossible to break the connection between the threaded adapter and the screwed wellhead, even after heat is applied to the threaded adapter. In those instances, a cutting torch may be used to cut the threaded adapter 40 off the screwed wellhead, thereby destroying the threaded adapter while nevertheless allowing the wellhead flange to be reused with another threaded adapter. This ease of removal of the threaded adapter 40 also significantly reduces the risk that the comparatively expensive screwed wellhead will not be damaged during the adapter removal operation. Again, the relatively small mass of the threaded adapter facilitates easy removal of the threaded adapter from the screwed wellhead, even if the threaded adapter must be destroyed during that removal process. Those skilled in the art will also appreciate that the cost of the adapter is significantly less than the cost of the components of the assembly 12, which can be saved even if the threaded adapter must be cut off the screwed wellhead. Those skilled in the art will appreciate that the bolt holes 44 in the wellhead flange 42 may be arranged for receiving a plurality of bolts to interconnect the wellhead flange and the lower flange of a blowout preventer, and that it is advantageous to position these bolt holes radially outward from the securing members 48, which removably interconnect the wellhead flange and the threaded adapter.

Figure 3:
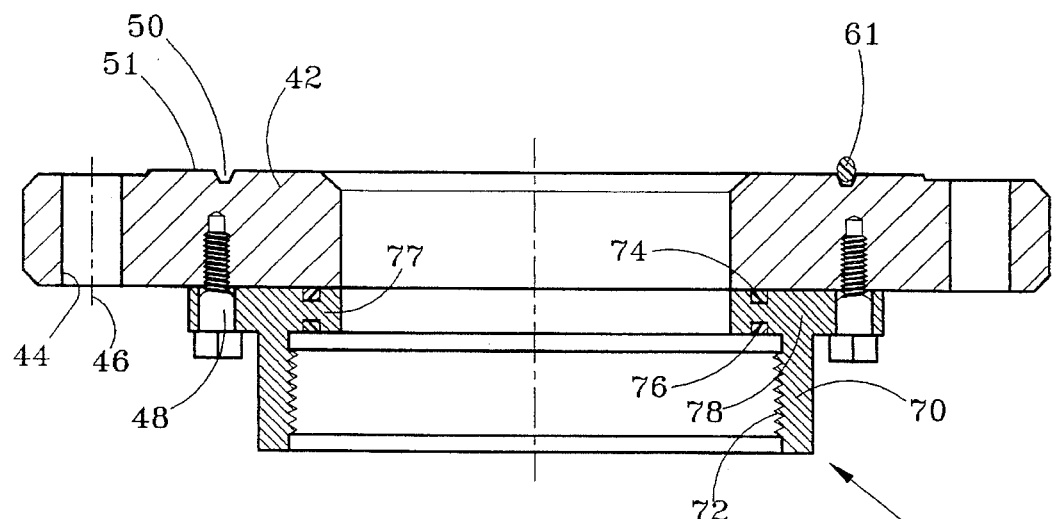
FIGS. 3, 4 and 5 are each detailed cross-sectional views of alternate embodiments of the drilling flange assembly as shown in FIG. 2.
Figure 4:
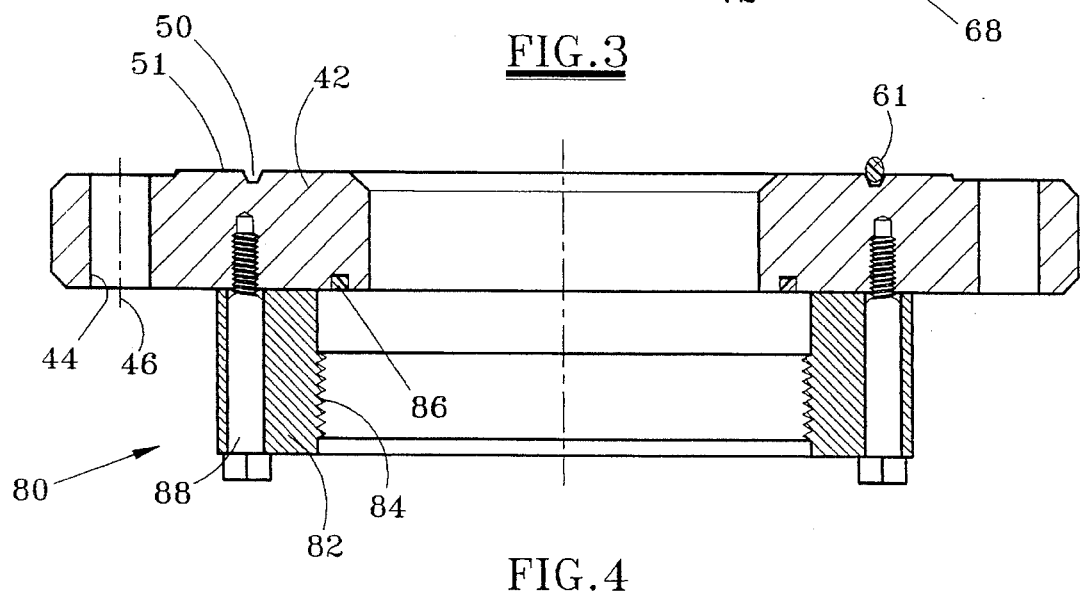
Figure 5:
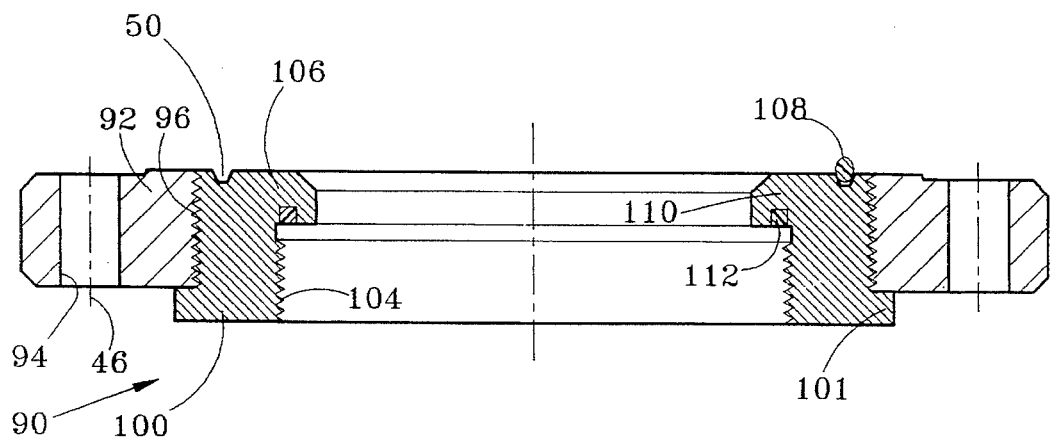

FIGS. 3, 4 and 5 each illustrate alternate embodiments of the wellhead flange assembly shown in FIG. 2. The same numerals accordingly will be used in FIGS. 3, 4 and 5 for like components. FIG. 3 discloses a two-piece wellhead flange assembly 68. The threaded adapter 70 includes internal threads 72, and an upward radially outwardly projecting portion 78 for receiving the securing members 48 previously discussed. The top planar surface of the threaded adapter includes a groove for receiving an 0-ring seal 74 for sealing engagement with the lower planar surface of flange 40. A similar lower seal 76 is provided for sealing engagement with an end surface of the tubular to be threaded to adapter 70. For this embodiment the support for the flange is not provided in the lower portion of the threaded adapter, but instead is provided by an upper portion of the threaded adapter. The upper flange support portion 78 still projects radially outwardly from the thin-walled portion of the threaded adapter. If desired, the entire body of the threaded adapter, with the exception of the radially inwardly projecting portion 77 which hold the seals 74 and 76 may have a substantially uniform outer diameter, in which case the length of the bolts 48 will be increased to accommodate the heavier threaded adapter.

The design shown in FIG. 4 illustrates this "heavier" adapter threaded flange concept. Accordingly, longer bolts 88 are provided in the FIG. 4 embodiment compared to the FIG. 3 embodiment. Another change to the FIG. 4 embodiment is that the assembly 80 does not include a flange support portion projecting radially outward from the thin-walled portion of the adapter 82. Instead, seal 86 is positioned on the flange 40 for sealing engagement with the tubular which is threaded to the threads 84 of the threaded adapter 82. Accordingly, the FIG. 4 concept utilizes a single seal rather than the two seal concept as shown in FIG. 3.

The assembly 90 as shown in FIG. 5 utilizes a smaller lower flange support portion 101 projecting radially outward from the thin-walled portion of the threaded adapter 100. Accordingly, the bolts which previously served as the securing members between the threaded adapter 102 and the flange 92 have been replaced with threads 96 to provide this alternative embodiment. The small shoulder 101 as shown in FIG. 5 acts as a stop to limit the distance that the adapter 102 can be threaded into the flange 92. In the FIG. 5 design, the radially inwardly projecting portion 110 of the threaded adapter 1130 accommodates a first seal 112 for sealing engagement with the tubular to be threaded at 104. The seal 61 on the upper portion of the assembly as shown in FIGS. 3 and 4 is replaced with a seal 108 which is provided on the threaded adapter rather than on the flange portion of the assembly. The flange 92 includes a plurality of apertures 94 for receiving bolts to interconnect the assembly with the components of the wellhead, as previously discussed. The top surface 106 of the threaded adapter thus includes the annular groove 54 for receiving the seal 108.

Modification to the equipment discussed above may be made to allow a wellhead to become more easily packed off after drilling and completing the well. The threaded cap or top nut normally furnished with the body to pack off the casing annulus may be discarded, and a two-piece cap or gland utilizing two flanges that bolt together may be used. Both flanges may have a desired outside diameter, bolt circle diameter, and bolt size/quantity. The lower flange may be flange 42 as shown in FIG. 2, which may be left permanently installed with the threaded adapter on the casing head. The top side of flange 42 would thus be designed to mate when a BOP is installed on the casing head. Upon removal of the BOP and completing the well, a significantly smaller upper flange (not shown) would replace the BOP flange and would be structured to compress the casing annulus seal in a similar fashion to the top nut. This design allows retrofitting of existing independent screwed casing head bodies and avoids the additional expense of welding a lower flange to a standard independent screwed casing head.

Another variation of the drilling wellhead flange assembly may involve discarding the existing threaded top casing head body and top nut in favor of a body with an integral forged, cast, or welded lower flange having desired and preferably compact dimensions. This arrangement would be somewhat more expensive to manufacture, but would still be less expensive than the API flanged casing head with a pack-off plate. The lower flange could then be a separate part that was welded to an unthreaded casing head body.

The various embodiments of the invention as described above and the method disclosed herein will suggest further modifications and alterations to those skilled in the art. Such further modifications and alterations will be made without departing from the spirit or the scope of the invention, which is defined by the scope of the following claims.

What is claimed is:

1. A wellhead flange assembly for interconnecting a threaded end of an upwardly projecting screwed wellhead with a lower flange of a blowout preventer positioned above the screwed wellhead, the flange assembly comprising:

a threaded adapter including a thin-walled portion having an outer surface and radially internal threads for threaded engagement with the threaded end of the upwardly projecting screwed wellhead, a flange support portion projecting radially outward from the thin-walled portion, and an upper stop portion projecting radially inward from the thin-walled portion for engagement with the screwed wellhead;

a wellhead flange including internal surface for engagement with the outer surface of the thin-walled portion, a plurality of bolt holes passing through the wellhead flange and arranged circumferentially about the wellhead flange, and an upper surface for engagement with the lower flange of the blowout preventer, the wellhead flange being supported on the flange support portion of the threaded adapter; and a plurality of securing members for engaging the wellhead flange and threaded adapter for selectively connecting and disconnecting the wellhead flange and the threaded adapter.

2. The wellhead flange assembly as defined in claim 1, wherein the plurality of bolt holes in the wellhead flange are each spaced radially outward of the plurality of securing members for facilitating a bolted interconnection of the wellhead flange and the lower flange of the blowout preventer.

3. The wellhead flange assembly as defined in claim 2, wherein each of the plurality of securing members includes a threaded bolt passing through an aperture in the threaded adapter and received within a threaded pocket within the wellhead flange.

4. The wellhead flange assembly as defined in claim 1, further comprising:

an adapter-to-flange seal for sealing engagement between the threaded adapter and the wellhead flange.

5. The wellhead flange assembly as defined in claim 1, wherein the threaded adapter further includes an adapter-to-wellhead seal for sealing engagement between the threaded adapter and the screwed wellhead.

6. The wellhead flange assembly as defined in claim 1, further comprising:

the flange having a generally cylindrically shaped internal wall portion; and the adapter-to-flange seal being supported on the threaded adapter for sealing engagement with the cylindrically shaped internal wall portion of the wellhead flange.

7. The wellhead flange assembly as defined in claim 1, wherein:

the upper surface of the wellhead flange includes a planar portion for engagement with the lower flange of the blowout preventer; and an annular groove within the upper surface of the wellhead flange for facilitating sealing engagement between the wellhead flange and the lower flange of the blowout preventer.

8. The wellhead flange assembly as defined in claim 1, wherein the thin-walled portion of the threaded adapter has a substantially uniform radial thickness of less than 66% of the diameter of the radially internal threads.

9. The wellhead flange assembly as defined in claim 8, wherein the substantially uniform radial thickness of the thin-walled portion is less than about 18% of the diameter of the radially internal threads.

10. A wellhead flange assembly for interconnecting a threaded end of an upwardly projecting screwed wellhead with a lower flange of a blowout preventer positioned above the screwed wellhead, the flange assembly comprising:

a threaded adapter including a thin-walled portion having an outer surface and radially internal threads for threaded engagement with the threaded end of the upwardly projecting screwed wellhead, and a lower flange support portion projecting radially outward from the thin-walled portion;

a wellhead flange including internal surface for engagement with the outer surface of the thin-walled portion, a plurality of bolt holes passing through the wellhead flange and arranged circumferentially about the wellhead flange, and an upper surface for engagement with the lower flange of the blowout preventer, the wellhead flange being supported on the flange support portion of the threaded adapter; and a plurality of securing members for engaging the wellhead flange and threaded adapter for selectively connecting and disconnecting the wellhead flange and the threaded adapter.

11. The wellhead flange assembly as defined in claim 10, wherein the plurality of bolt holes in the wellhead flange are each spaced radially outward of the plurality of securing members for facilitating a bolted interconnection of the wellhead flange and the lower flange of the blowout preventer.

12. The wellhead flange assembly as defined in claim 10, wherein the threaded adapter further includes an adapter-to-flange seal for sealing engagement between the threaded adapter and the wellhead flange, and an adapter-to-wellhead seal for sealing engagement between the threaded adapter and the screwed wellhead.

13. The wellhead flange assembly as defined in claim 10, wherein:

the upper surface of the wellhead flange includes a planar portion for engagement with the lower flange of the blowout preventer; and an annular groove within the upper surface of the wellhead flange for facilitating sealing engagement between the wellhead flange and the lower flange of the blowout preventer.

14. The wellhead flange assembly as defined in claim 10, wherein the plurality of securing members comprising a plurality of threads for selectively connecting and disconnecting the wellhead flange and the threaded adapter.

\* \* \* \* \*